Jan. 28, 1941.   R. C. LAWRENCE   2,229,748
MEASURING APPARATUS
Filed April 13, 1939
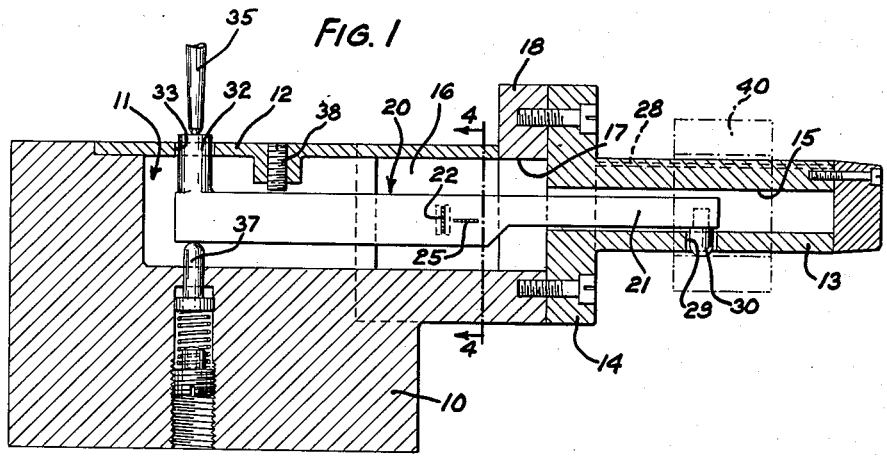
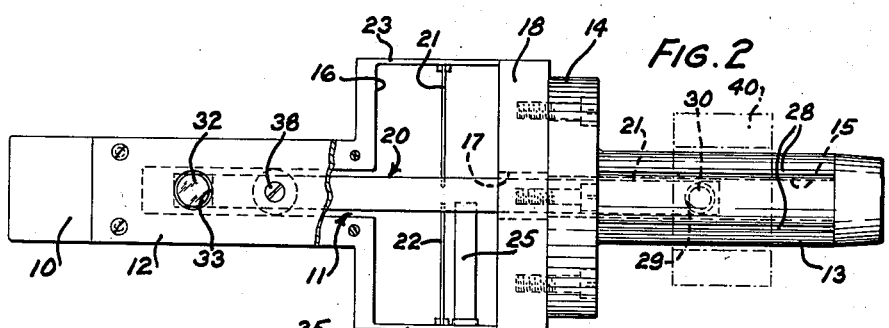
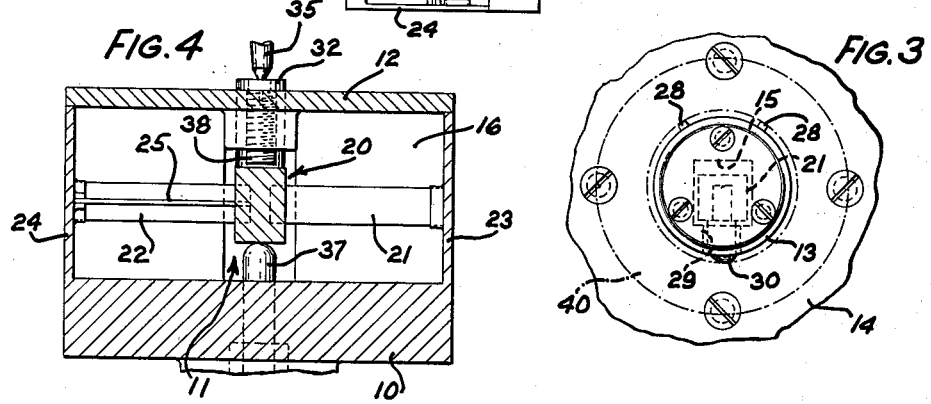
INVENTOR
R. C. LAWRENCE
BY Emery Robinson.
ATTORNEY Patented Jan. 28, 1941

2,229,748

UNITED STATES PATENT OFFICE 2,229,748

MEASURING APPARATUS

Roger C. Lawrence, Ridgewood, N. J., assignor to Western Electric Company, Incorporated, New York, N. Y., a corporation of New York Application April 13, 1939, Serial No. 267,550

5 Claims. (Cl. 33—178)

This invention relates to measuring apparatus, and more particularly to an apparatus for measuring internal dimensions of hollow articles.

Objects of the invention are to provide a simple, inexpensive and durable measuring apparatus by means of which dimensions of articles may be measured expeditiously and with a high degree of accuracy.

In accordance with the above objects, one embodiment of the invention contemplates the provision of an apparatus for measuring internal dimensions of hollow articles, in which a movable measuring bar is suspended intermediate its ends upon two reeds or flat springs attached to opposite sides of the bar with their flat surfaces perpendicular to the longitudinal axis of the bar. A third reed or flat spring is attached to the bar with its flat surfaces in the plane of the longitudinal axis of the bar to prevent endwise movement of the bar. The construction and arrangement of the parts are such that the reeds are subjected to torsional bending upon movement of one end of the bar into engagement with an article being measured.

A more complete understanding of the invention may be had from the following detailed description when read in conjunction with the accompanying drawing, in which Fig. 1 is a vertical sectional view of a measuring apparatus embodying the features of the invention;

Fig. 2 is a plan view thereof, with a portion of the enclosing structure broken away to show the supporting reeds for the measuring arm;

Fig. 3 is an enlarged fragmentary end elevational view of the apparatus looking from the right in Fig. 1, and Fig. 4 is an enlarged fragmentary sectional view taken on line 4—4 of Fig. 1.

Referring now to the drawing, the apparatus illustrated therein comprises a supporting member 10 having a channel-like cavity 11 over which a cover plate 12 is removably attached. A cylindrical arbor 13 has an end flange 14 by means of which it is attached to one end of the supporting member. The arbor is provided with a longitudinal bore 15 of rectangular cross-section, which communicates with an enlarged end portion 16 of cavity 11 through a slot 17 in an end wall 18 of the cavity.

A movable measuring bar 20 is mounted within the cavity 11 and has a reduced end portion 21 which projects through the slot 17 and into the bore of arbor 13, as best shown in Fig. 1. Attached at one end to opposite sides of the measuring bar and intermediate the ends thereof are a pair of reeds or flat springs 21 and 22 (Figs. 2 and 4), the opposite ends of which are secured to opposite side walls 23 and 24, respectively, of the enlarged cavity portion 16. The springs 21 and 22 are mounted so that their flat surfaces are normally disposed in a plane perpendicular to the longitudinal axis of the measuring bar. An additional reed or flat spring 25 is secured at one end to the measuring bar and is attached at its opposite end to wall 24. The spring 25 is disposed with its flat surfaces perpendicular to the springs 21 and 22 and in the plane of the longitudinal axis of the measuring bar, whereby endwise movement of the bar is prevented. It will be understood that the measuring bar is, in effect, pivotally supported intermediate its ends by means of the springs, which are subjected to a slight torsional bending or twisting action upon pivotal movement of the bar. The side wall portions 23 and 24, to which the springs are attached, may be relatively thin, as shown, so that they can be deflected inwardly by the increased tension on the springs due to the slight shortening thereof which might result from the torsional bending.

The arbor 13 is provided externally with two fixed hardened steel rails or shoes 28, 28 which extend longitudinally of the arbor and are spaced from each other, as shown in Fig. 3. Diametrically opposite a point midway between the two fixed rails, the arbor is provided with a radially extending aperture 29. A stud 30 is attached to the reduced end portion of the measuring bar and is adapted to project through the aperture 29 to engage a surface of an article to be measured. A stud 32 is provided on the opposite end of the measuring bar on the side opposite the article engaging stud, and the cover plate is provided with an aperture 33 through which the stud 32 is adapted to project to engage and operate a movable contacting plunger 35 of any suitable gauging apparatus (none shown), by means of which the movement of the measuring bar may be suitably magnified and visually indicated.

The studs 30 and 32 are spaced equal distances from the bar supporting springs so that the extent of movement of the stud 32 will always be the same as the extent of movement of the article engaging stud 30. The latter stud is yieldably urged radially outwardly of the arbor by a spring pressed plunger 37 which normally urges the measuring bar in a clockwise direction against an adjustable stop screw 38 mounted in the cover plate 12.

When employing the apparatus for measuring the internal diameter of a cylindrical article, such as indicated by the broken lines 40 in the drawing, the article is placed on the arbor 14 so that the fixed contact rails 28 engage the inner cylindrical surface of the article and thereby properly preposition it with respect to the movable contact stud 30. If the internal diameter of the article is within predetermined limits, the movable contact stud is moved radially inwardly to an extent corresponding to the diameter of the article. A corresponding counterclockwise movement is thus imparted to the measuring bar 20, which transmits the movement of contact stud 30 to the stud 32 at the opposite end of the measuring bar. As mentioned above, any suitable apparatus (none shown) may be employed for suitably magnifying the movement of the measuring bar and for visually indicating the extent of such movement and thereby the difference between the measured dimension and a predetermined standard.

It will be obvious that by employing flat springs instead of the usual pivot screws for pivotally supporting the measuring bar, inaccuracies, such as result because of wear of the parts when pivot screws are employed, are eliminated. Also, by arranging the supporting springs as contemplated by this invention, it is possible to obtain a pivotal movement of the measuring bar which approximates that obtained by the use of pivot screws.

It should be understood that the invention is not limited to the particular embodiment thereof herein illustrated and described, except insofar as is defined by the appended claims.

What is claimed is:

1. In a measuring apparatus, a fixed supporting member, a movable member, a flat spring attached at one end to the supporting member and at its opposite end to the movable member, said spring being disposed with respect to said members so that it is subjected to a torsional bending action upon movement of said movable member, and a second flat spring secured to said members with its flat surfaces substantially parallel to the longitudinal axis of said movable member.

2. In a measuring apparatus, a movable measuring member, and means for movably supporting said member, comprising a fixed support, a flat spring attached at one end to the measuring member and projecting laterally therefrom and attached at its opposite end to said support, said spring being disposed with its flat surfaces substantially perpendicular to the longitudinal axis of said measuring member, and means for preventing endwise movement of said measuring member, said means comprising a second flat spring attached to the support and the measuring member adjacent the first spring and disposed with its flat surfaces substantially parallel to the longitudinal axis of the measuring member.

3. In a measuring apparatus, a fixed supporting member, a movable measuring member, and a pair of flat springs interconnecting said members, said springs being disposed with their flat surfaces perpendicular to each other and with the flat surfaces of one of the springs substantially perpendicular to the longitudinal axis of the measuring member.

4. In a measuring apparatus, a movable measuring bar, and means for supporting said bar comprising a fixed support, a pair of flat springs attached at one end to opposite sides of the measuring bar intermediate the ends thereof and projecting laterally therefrom with their flat surfaces perpendicular to the longitudinal axis of said bar, said springs being attached at their opposite ends to said support, and a third flat spring attached at one end to the measuring bar adjacent one of said pair of springs, the said third spring projecting laterally from said bar, being attached at its opposite end to the support and being disposed with its flat surfaces substantially parallel to the longitudinal axis of said bar.

5. In a measuring apparatus, a movable measuring bar, and means for pivotally supporting said bar, comprising a support, a flat spring attached to the bar and having a portion projecting laterally therefrom and attached to a portion of the support, said attaching portion of the support being yieldable to compensate for the shortening of the spring resulting from the torsional bending thereof upon pivotal movement of said measuring bar.

ROGER C. LAWRENCE.